Nov. 2, 1926.

H. T. BELLAMY 1,605,205

METHOD OF SECURING A UNION BETWEEN ELEMENTS

Filed May 30, 1924

Inventor
Harry T. Bellamy
by Matthews Atty.

Patented Nov. 2, 1926.

1,605,205

UNITED STATES PATENT OFFICE.

HARRY TRISTRAM BELLAMY, OF RIVER FOREST, ILLINOIS, ASSIGNOR TO WESTERN ELECTRIC COMPANY, INCORPORATED, OF NEW YORK, N. Y., A CORPORATION OF NEW YORK.

METHOD OF SECURING A UNION BETWEEN ELEMENTS.

Application filed May 30, 1924. Serial No. 716,843.

This invention relates to a method of securing a union between elements, and more particularly to an improved method of attaching ceramic elements to each other.

The present invention is particularly applicable in the assembling of protector blocks commonly used in electrical circuits as a protection against high tension alternating currents. In order to function properly, a protector block of this type must meet various requirements; i. e., the character of the bond between the porcelain block and the carbon electrode must be such that it will not be deleteriously affected when subjected to a given pressure, and the character of bonding material used must be such that it will almost instantly melt and give way when simultaneously subjected to a given current and pressure.

In order to meet the above mentioned requirements, several methods have been employed heretofore for securing a suitable bond between the carbon electrode and the porcelain block. One method consisted in securing the carbon electrode to the porcelain block by some cementing material such as a low melting point glass, the cementing material being made up in rods of small diameter, one end of the rod being placed adjacent the surfaces of the carbon and porcelain blocks, while the blocks were subjected to a temperature sufficiently high to melt the glass, whereby the glass adhered to both blocks and served to cement them together. In practice it has been found that the making of the glass rods is expensive, and, since they are necessarily small in diameter and exceedingly fragile, they may be easily broken in handling, producing many lengths which are too short for an operator to manipulate in cementing the blocks together, whereby a large wastage of glass rods might result.

Another method which has been employed in some instances in assembling protector blocks consisted in placing the carbon electrode in its approximate position in the porcelain block and then positioning a small tablet of cementing material adjacent the two contacting surfaces of the blocks. The assembled blocks were then subjected to a temperature sufficiently high to melt the tablet so that it adhered to the contacting surfaces of the blocks thereby securing or bonding them together. This method also proved to be somewhat unsatisfactory due to the fact that it required a high degree of skill and careful supervision to produce satisfactory results.

The primary object of this invention is to provide a simple, inexpensive and rapid method of effecting a union or bond between elements.

Another object of this invention is to provide a better bond between ceramic elements, particularly porcelain and carbon.

A further object of this invention is to provide an improved method of assembling protector blocks whereby a better bond is secured between the carbon electrode and the porcelain block.

To attain these objects and in accordance with the general features of the invention, one method which may be employed in the assembling of protector blocks consists in applying a combustible adhesive, such as gum arabic, to the surfaces of the carbon block and then applying a bonding material, such as powdered lead borate, at the points where the union is to be made. The carbon block is then placed in its approximate position in the porcelain block and the parts so assembled are placed in an oven and subjected to a temperature sufficiently high to consume the adhesive and soften the bonding material causing it to adhere to the contacting surfaces of the blocks thereby securing them together. After cooling, the assembled protector block may then be reheated, and the carbon block accurately positioned by the method and apparatus disclosed in Patent No. 1,406,681, issued February 14, 1922, to R. E. Ottman.

In the accompanying drawings which illustrate one embodiment of the invention,

Figure 1:
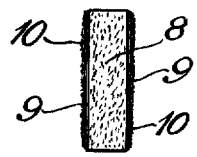
Fig. 1 is an enlarged plan view of a carbon block with the surfaces to which the porcelain block is to be secured provided with a stripe of gum arabic over which is superimposed a layer of powdered lead borate.
Figure 2:
Fig. 2 is a side elevation of the block shown in Fig. 1.
Figure 3:
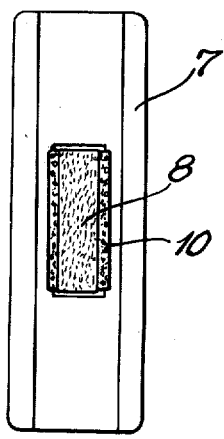
Fig. 3 is an enlarged plan view of an assembled protector block.
Figure 4:
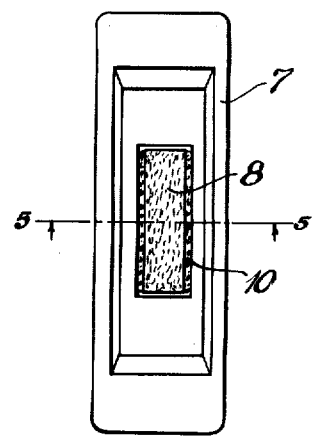
Fig. 4 is an enlarged bottom view thereof.
Figure 5:
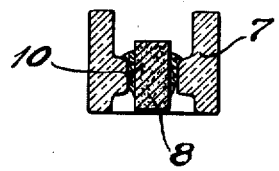
Fig. 5 is a vertical section taken on the line 5—5 of Fig. 4, showing the manner in which the melted or fused lead borate adheres to the contacting surfaces of the carbon and porcelain blocks.

Referring now to the drawings in detail, the reference numeral 7 indicates a block of porcelain to which is secured a carbon electrode 8. To secure the carbon electrode to the porcelain block a stripe of gum arabic 9 or other combustible adhesive is applied to the surfaces of the carbon electrode, as clearly shown in Fig. 1. A suitable quantity of powdered lead borate 10 is then superimposed and pressed into the gum arabic at the points where the union is to be made, and the electrode is then placed in its approximate position in the porcelain block. The assembled protector is then heated by placing it in an oven, or by any other suitable method, to a temperature sufficiently high to consume the gum arabic and melt or fuse the lead borate causing it to become plastic and adhere to the adjacent surfaces of the carbon electrode and the porcelain block in the manner illustrated in Fig. 5. The protector is then removed from the oven and in cooling, the bonding material solidifies, thereby securing the parts in their assembled positions. The assembled protectors may then be reheated at a temperature at which the bonding material becomes plastic or soft, and the carbon block accurately positioned by the method and apparatus disclosed in the Ottman patent heretofore referred to.

A particularly suitable bonding material for use in connection with this invention comprises lead borate in powdered form which consists of approximately 85% lead oxide and 15% boric acid. This is an important advantage of this method over the former methods, since powdered lead borate is much easier to prepare than lead borate rod or lead borate tablets. Any adhesive may be used as well as gum arabic, it only being necessary that it be either combustible or fusible. Very satisfactory results have been obtained by firing the assembled blocks about four minutes at a temperature of about 1100° F.

What is claimed is:

1. The method of securing two parts together consisting in treating one of the parts with an adhesive and a bonding material, assembling the parts and then treating them so as to render the adhesive ineffective.

2. The method of securing two parts together consisting in treating one of the parts with an adhesive and a bonding material, assembling the parts and then treating them so as to render the adhesive ineffective and cause the bonding material to become plastic.

3. The method of securing two parts together consisting in treating one of the parts with an adhesive and a bonding material, assembling the parts and then treating them so as to render the adhesive ineffective and cause the bonding material to become plastic and adhere to the adjacent surfaces of both parts, thereby effecting a union between them.

4. The method of securing two parts together consisting in treating one of the parts with an adhesive and a bonding material, assembling the parts and treating them so as to render the adhesive ineffective and cause the bonding material to become plastic and adhere to the adjacent surfaces of both parts, then hardening said bonding material thereby rigidly securing the parts together.

5. The method of securing two parts together consisting in treating one of the parts with an adhesive and a bonding material, assembling the parts and then subjecting them to a temperature sufficiently high to consume the adhesive.

6. The method of securing two parts together consisting in treating one of the parts with a combustible adhesive and a fusible bonding material, assembling the parts and then subjecting them to a temperature sufficiently high to consume the adhesive and soften the bonding material.

7. The method of securing two parts together consisting in applying an adhesive material to one of the parts adjacent the point where the union is to be made, applying a bonding material to said adhesive material, assembling the parts and then subjecting them to a temperature sufficiently high to consume the adhesive material and cause the bonding material to soften and adhere to both of said parts to effect a union between them.

8. The method of securing a carbon part to a porcelain part, consisting in treating one of said parts with a considerable adhesive and a fusible bonding material, assembling the parts and then subjecting them to a temperature sufficiently high to consume the adhesive and soften the bonding material.

9. The method of securing a union between a carbon part and a porcelain part, consisting in applying a coating of combustible adhesive to the carbon part, applying a layer of powdered cement over said combustible adhesive, assembling the parts and subjecting them to a temperature sufficiently high to consume the adhesive and cause the cement to melt and adhere to both of said parts to cause a union between them.

10. The method of securing a union between a carbon part and a porcelain part, consisting in applying a coating of combustible adhesive to the carbon part, superimposing a layer of fusible bonding material over said adhesive material, assembling the parts and subjecting them to a temperature sufficiently high to render the adhesive ineffective and soften the bonding material causing it to adhere to adjacent surfaces of said parts, then hardening said bonding material, thereby rigidly securing the parts together.

11. The method of assembling a protector block which consists in treating a conducting element with an adhesive and a noncombustible cement, depositing said element in an opening formed in a non-conducting block to receive it, subjecting said block and element to a temperature sufficiently high to consume the adhesive and melt the cement.

12. The method of assembling protector blocks, which consists in applying an adhesive to a conducting electrode, applying a fusible bonding material over said adhesive adjacent the point where the union is to be made, positioning said electrode in an opening formed in a nonconducting block to receive it, subjecting said block and electrode to a temperature sufficiently high to render the adhesive ineffective and soften the bonding material causing it to adhere to adjacent surfaces of both parts, and then hardening said bonding material, thereby rigidly securing the parts together.

13. The method of securing two parts together which consists in applying gum arabic to one of the parts, applying lead borate over said gum arabic, assembling the parts and then subjecting them to a temperature sufficiently high to consume the gum arabic and melt the lead borate.

14. The method of securing two parts together consisting in applying gum arabic to one of the parts adjacent the point where the union is to be made, applying lead borate in powdered form over said gum arabic, assembling the parts and then subjecting them to a temperature sufficiently high to consume the gum arabic and cause the lead borate to melt and adhere to both of said parts to cause a union between them.

15. A method of assembling protector blocks which consists in applying gum arabic to an electrical conducting electrode, applying lead borate over said gum arabic, depositing said conducting electrode in an opening formed in a non-conducting block to receive it and then subjecting said block and electrode to a temperature sufficiently high to consume the gum arabic and cause the lead borate to melt and adhere to both of said parts to cause a union between them.

16. The method of securing two parts together consisting in applying an adhesive and a cementing material to one of the parts, assembling the parts, and then subjecting them to heat to render the cementing material effective for joining said parts.

In witness whereof, I hereunto subscribe my name this 23 day of May A. D., 1924.

HARRY TRISTRAM BELLAMY.

effective and soften the bonding material causing it to adhere to adjacent surfaces of said parts, then hardening said bonding material, thereby rigidly securing the parts together.

11. The method of assembling a protector block which consists in treating a conducting element with an adhesive and a noncombustible cement, depositing said element in an opening formed in a non-conducting block to receive it, subjecting said block and element to a temperature sufficiently high to consume the adhesive and melt the cement.

12. The method of assembling protector blocks, which consists in applying an adhesive to a conducting electrode, applying a fusible bonding material over said adhesive adjacent the point where the union is to be made, positioning said electrode in an opening formed in a nonconducting block to receive it, subjecting said block and electrode to a temperature sufficiently high to render the adhesive ineffective and soften the bonding material causing it to adhere to adjacent surfaces of both parts, and then hardening said bonding material, thereby rigidly securing the parts together.

13. The method of securing two parts together which consists in applying gum arabic to one of the parts, applying lead borate over said gum arabic, assembling the parts and then subjecting them to a temperature sufficiently high to consume the gum arabic and melt the lead borate.

14. The method of securing two parts together consisting in applying gum arabic to one of the parts adjacent the point where the union is to be made, applying lead borate in powdered form over said gum arabic, assembling the parts and then subjecting them to a temperature sufficiently high to consume the gum arabic and cause the lead borate to melt and adhere to both of said parts to cause a union between them.

15. A method of assembling protector blocks which consists in applying gum arabic to an electrical conducting electrode, applying lead borate over said gum arabic, depositing said conducting electrode in an opening formed in a non-conducting block to receive it and then subjecting said block and electrode to a temperature sufficiently high to consume the gum arabic and cause the lead borate to melt and adhere to both of said parts to cause a union between them.

16. The method of securing two parts together consisting in applying an adhesive and a cementing material to one of the parts, assembling the parts, and then subjecting them to heat to render the cementing material effective for joining said parts.

In witness whereof, I hereunto subscribe my name this 23 day of May A. D., 1924.

HARRY TRISTRAM BELLAMY.

Certificate of Correction.

It is hereby certified that in Letters Patent No. 1,605,205, granted November 2, 1926, upon the application of Harry Tristram Bellamy, of River Forest, Illinois, for an improvement in "Methods of Securing a Union Between Elements," an error appears in the printed specification requiring correction as follows: Page 2, line 108, claim 8, for the word "considerable" read *combustible;* and that the said Letters Patent should be read with this correction therein that the same may conform to the record of the case in the Patent Office.

Signed and sealed this 18th day of January, A. D. 1927.

[SEAL.]

M. J. MOORE,
*Acting Commissioner of Patents.*

Certificate of Correction.

It is hereby certified that in Letters Patent No. 1,605,205, granted November 2, 1926, upon the application of Harry Tristram Bellamy, of River Forest, Illinois, for an improvement in " Methods of Securing a Union Between Elements," an error appears in the printed specification requiring correction as follows: Page 2, line 108, claim 8, for the word "considerable" read *combustible;* and that the said Letters Patent should be read with this correction therein that the same may conform to the record of the case in the Patent Office.

Signed and sealed this 18th day of January, A. D. 1927.

[SEAL.]
M. J. MOORE,
*Acting Commissioner of Patents.*